US006995793B1

(12) United States Patent
Albadawi et al.

(10) Patent No.: US 6,995,793 B1
(45) Date of Patent: Feb. 7, 2006

(54) VIDEO TAP FOR A DIGITAL MOTION CAMERA THAT SIMULATES THE LOOK OF POST PROCESSING

(75) Inventors: Haithem Albadawi, Rochester, NY (US); Nestor M. Rodriguez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 896 days.

(21) Appl. No.: 09/712,639

(22) Filed: Nov. 14, 2000

(51) Int. Cl.
*H04H 5/262* (2006.01)
(52) U.S. Cl. ............. 348/239; 348/207.99; 348/231.8; 348/333.11; 348/578
(58) Field of Classification Search ................ 348/578, 348/207.99, 239
See application file for complete search history.

(56) References Cited

U.S. PATENT DOCUMENTS

| | | | | |
|---|---|---|---|---|
| 4,642,678 A | * | 2/1987 | Cok | 348/242 |
| 4,714,962 A | | 12/1987 | Levine | 358/209 |
| 4,885,787 A | * | 12/1989 | Okamoto et al. | 382/260 |
| 4,935,816 A | * | 6/1990 | Faber | 348/578 |
| 5,140,414 A | * | 8/1992 | Mowry | 348/577 |
| 5,457,491 A | * | 10/1995 | Mowry | 348/104 |
| 5,475,425 A | * | 12/1995 | Przyborski et al. | 348/239 |
| 5,641,596 A | * | 6/1997 | Gray et al. | 430/21 |
| 5,831,673 A | * | 11/1998 | Przyborski et al. | 348/239 |
| 5,852,502 A | | 12/1998 | Beckett | 358/512 |
| 5,883,696 A | | 3/1999 | Bowers et al. | 352/136 |
| 5,926,218 A | | 7/1999 | Smith | 348/358 |
| 6,122,006 A | | 9/2000 | Bogdanowicz et al. | 348/222 |
| 2002/0044699 A1 | * | 4/2002 | Kozuka | 382/312 |

OTHER PUBLICATIONS

U.S. Appl. No. 09/082,958, filed May 21, 1998, Rodriguez.
"The HDTV Camcorder and the March to Marketplace Reality" by Laurence J. Thorpe, Fumio Nagumo, and Kazuo Ike. SMPTE Journal, Mar. 1998, pp 164-177.

* cited by examiner

*Primary Examiner*—Thai Tran
*Assistant Examiner*—Chriss S. Yoder
(74) *Attorney, Agent, or Firm*—David M. Woods; Stephen H. Shaw

(57) ABSTRACT

A sequence of motion images, captured by an image capture system such as a digital camera, are converted into a sequence of modified motion images providing the appearance of motion images captured by the same capture system and subsequently rendered in a post-processing stage to simulate a particular look. The method involves capturing a sequence of motion images using a full resolution image sensor system, then recording the full resolution unprocessed image signals, and providing the recorded full resolution unprocessed image signals to the post-production process, where the images will be subsequently rendered in a post-processing stage to simulate a particular look. Meanwhile, one or more image processing algorithms are applied in the image capture system to the unprocessed image signals to simulate the particular look rendered in the post-processing stage, and the simulated image signals are displayed as a sequence of modified images.

14 Claims, 4 Drawing Sheets

VIDEO TAP FOR A DIGITAL MOTION CAMERA THAT SIMULATES THE LOOK OF POST PROCESSING

FIELD OF THE INVENTION

The present invention relates generally to the field of video processing or digital image processing that is intended to emulate a particular look. More specifically, the invention relates to rendering an electronically captured image to emulate a post-production process, that is, to provide the appearance given to an image after undergoing post-processing subsequent to image capture.

BACKGROUND OF THE INVENTION

Film cameras of the type typically used in professional cinematographic production provide the camera operator with an optical image corresponding to the image exposed on film. With the advent of compact video components, professional motion picture cameras have been modified to employ a video pickup (often referred to as a "video tap") built into the film camera in order to facilitate certain cinematic decisions about the captured image and to allow other people to view the image seen by the camera operator through the viewfinder eyepiece.

The video tap shows the whole of the image area recorded at the film gate together with a superimposed bright outline, generated electronically from the signal processing unit, to indicate the limit of the projected frame area so that the picture can be accurately composed. When using an anamorphic camera lens, the monitor image may be electronically unsqueezed so that the picture is shown in its correct proportions (see U.S. Pat. No. 5,883,696, in which the video system de-anamorphises the image displayed on the video monitor when anamorphic lenses are used in the film camera.). The picture is often a black and white television image rather than the actual colors of direct viewing but this is not regarded as a disadvantage. The main function of the video viewfinder normally is to check the composition of the scene, to follow the action to adjust focus as required and to generally make artistic decisions based on scene content. The definition and color reproduction characteristics of color television systems differ considerably from those of film and it is considered that a color monitor presentation would be of doubtful value even if it were conveniently and economically available.

Consequently, video taps are neither capable nor intended to predict the actual film look of a captured image sequence after it is post-processed and projected. This is understandable because there are numerous film stocks available to choose from for a video or motion picture production. Each of these film stocks has its own unique set of characteristics and capabilities, which ultimately influences the appearance of the captured scene. The viewed image from a video tap, however, does not necessarily reflect the exposures resultant on a film of interest, nor the appearance the scene would have after being recorded on the chosen film, processed and subsequently viewed.

Presently, a variety of methods are utilized to predict the look of a captured image sequence. One of those methods relies on a cinematographer's experience. An experienced cinematographer can relate how a setting under a specific lighting condition will look when it is finally processed for viewing. The problem with this method is that it is neither accurate nor consistent and it cannot be easily shared with others, as the predicted look of the image-sequence only exists in the cinematographer's mind.

Another method for predicting the look of a captured image sequence involves filming a representative scene and exposing the film under a variety of conditions which the cinematographer thinks will result in a captured scene having the desired appearance. The film is then processed overnight for viewing the next day (daily). Often the film is transferred to video via a telecine machine and viewed the next day on a video monitor (video daily). After viewing the processed, captured sequence the next day, a cinematographer will decide if the image sequence of interest needs to be shot again, or if the results were satisfactory. The problem with this method is that it does not provide real-time feedback and it is relatively costly.

The difficulties and high costs associated with dailies highlights the need for a device that could provide less expensive, reasonably accurate and more timely feedback concerning the cinematographer's predictions and adjustments for the lighting conditions of any scene. Another method for predicting the look of a captured image sequence is described in U.S. Pat. No. 6,122,006, which involves the initial capture of a still image for a particular set under a certain lighting condition using an instant photographic or electronic camera. The captured image is then scanned or downloaded into a computer, where it is digitally processed to simulate the desired look of a recorded image-sequence using a particular film. Once the desired look is obtained, the cinematographer uses a motion picture camera to capture the scene using the same film as selected in the simulated software. Although this method can provide a cinematographer feedback in a less expensive and more timely manner, this feedback is not instant and is limited to a still image that is not contemporaneous with motion capture, thus affecting accuracy. Moreover, no motion-based decisions such as the introduction of blur due to the image averaging effect of viewing motion sequences can be inferred from it.

In a typical digital motion camera, as well as the film cameras described above, a captured image sequence takes two processing paths. The first path involves the recording of the captured image sequence to a particular media (e.g., film, tape, or disk). The other path involves the displaying of the captured image sequence by an electronic monitor (e.g., the video tap). As explained above, a video display would potentially allow a cinematographer to make artistic decisions based (only) on scene content. It does not, however, allow the cinematographer to view how the final recorded scene will look after being processed and ultimately displayed in accordance with a particular post-production process.

There are a variety of methods known in the prior art for electronically capturing and processing an image sequence in real time separate from the main capture path. For instance, in U.S. Pat. No. 5,926,218, a low-resolution image sensor is used separate from a high-resolution image sensor in an electronic camera for viewing and camera control functions. Besides using the low-resolution sensor to generate a low-resolution output signal for a display device, the low resolution output is applied to a zoom interpolator, which processes the low resolution output signal so that the size of a display image obtained from the low resolution signal corresponds to the zoom setting of the zoom lens in front of the high resolution sensor. In this way, the projected display simulates the look of the zoomed high resolution image.

U.S. Pat. No. 4,714,962 describes a dual electronic camera that concurrently exposes a conventional photographic film and an electro-optical sensor, to provide both corresponding electronically recorded images and photographic latent images of objects. The electronic images are then viewed using an optical pre-viewer for "proofing" purposes, that is, to select those to be developed and printed. The capability to instantly preview the images before development of the film enables the user to select the film negative frames to be printed, as well as controlling the conditions of developing and printing of the film to correct for exposure of each frame. For example, the instant optical previewing allows the user to determine whether the image has been overexposed or underexposed. The viewing of the electronic image thus permits instructions to be imprinted on the film for these and other corrections, such as cropping, enlarging, reducing, and physically displacing portions of the image. In this patent, while the viewed images provide a photographer with the chance to proof an image frame based on scene content considerations, it is limited to still photography and does not allow a judgement based on how the captured images will look after being processed (and printed).

U.S. Pat. No. 5,852,502 describes a digital motion camera that has an optical assembly that directs visual images to a high-resolution monochrome sensor and a lower resolution color sensor. At any instance of time the two captured images using both sensors are composited to produce a high-resolution color composite image output. One copy of the image may be recorded using a film or digital recorder, and another copy may be projected on a display device. Even though a digital image processing algorithm is being applied to the captured image-sequence before viewing it, the purpose of this processing is to composite the color and luminance information of an image to produce a high-resolution colored image sequence. Although this patent allows for the image processing to provide a non-linear emphasis of particular ranges of colors, such as darker colors, mid range colors or a specific color, it is not the objective of this processing to match any post-processing that might later take place on the recorded captured sequence of images.

Prior art also exists for generating a broadcast film appearance with video or digitally captured images, where the processing occurs inside of the camera. In U.S. Pat. No. 5,475,425, a video camera provides for real time simulation of the visual appearance of motion picture film that has been transferred or converted to a video signal, by adding a selective adjustable amount of two-dimensional electronic artifacts to simulate film grain and by modifying the scan rate of the electronic sensors to imitate film shuttering. This video camera, however, is not providing any display of the processed video, and particularly is not operating on unprocessed RGB signals to provide a real time display image. In an article by L. J. Thorpe et al, "The HDTV Camcorder and the March to Marketplace Realty", *SMPTE Journal*, March 1998, pp. 164–177, setup cards have been described for beta-camcorders and also digital camcorders. These miniature plug-in setup cards facilitate prealignment of the camera to achieve an HD image having attributes similar to those that might otherwise be created from a film origination followed by telecine transfer to HD video. The setup cards can be pre-programmed to store desired digital data settings for aesthetic choices to be made concerning, among other characteristics, color reproduction, tonal reproduction and skin-tone detail. In both of these disclosures, however, there is no effort to match the in-camera processing to a subsequent suite of algorithms that would be applied to the digital image signal in a post-production process.

What is needed is a method and/or a device that could provide inexpensive, instant and accurate feedback concerning a cinematographer's predictions and adjustments for the lighting conditions of any scene, based on how particular post-production processing will affect the look of the captured image sequence.

SUMMARY OF THE INVENTION

The present invention is directed to overcoming one or more of the problems set forth above. Briefly summarized, according to one aspect of the present invention, a sequence of motion images, captured by an image capture system, are converted into a sequence of modified motion images providing the appearance of motion images captured by the same capture system and subsequently rendered in a post-processing stage to simulate a particular look. The method involves capturing a sequence of motion images using a full resolution image sensor system, resulting in a captured sequence of full resolution unprocessed image signals corresponding to the motion images, then recording the full resolution unprocessed image signals, and providing the recorded full resolution unprocessed image signals to a post-production process where the images will be subsequently rendered in a post-processing stage to simulate a particular look. Meanwhile, one or more image processing algorithms are applied in the image capture system to the unprocessed image signals to simulate the particular look rendered in the post-processing stage, thereby resulting in processed image signals, and the processed image signals are displayed as a sequence of modified images.

The advantage of this invention is that it provides a cinematographer with the ability to view a simulation of how a captured image sequence will look once it has been recorded and processed for a particular look.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because the use of video taps in connection with motion picture cameras, as well as the use of video or digital image processing systems to process a captured motion image sequence, are well known, the present description will be directed in particular to attributes forming part of, or cooperating more directly with, an apparatus and a method in accordance with the present invention. Attributes or elements not specifically shown or described herein may be selected from those known in the art. In the following description, a preferred embodiment of the present invention would ordinarily be implemented at least in part as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts.

If the invention is implemented in part as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
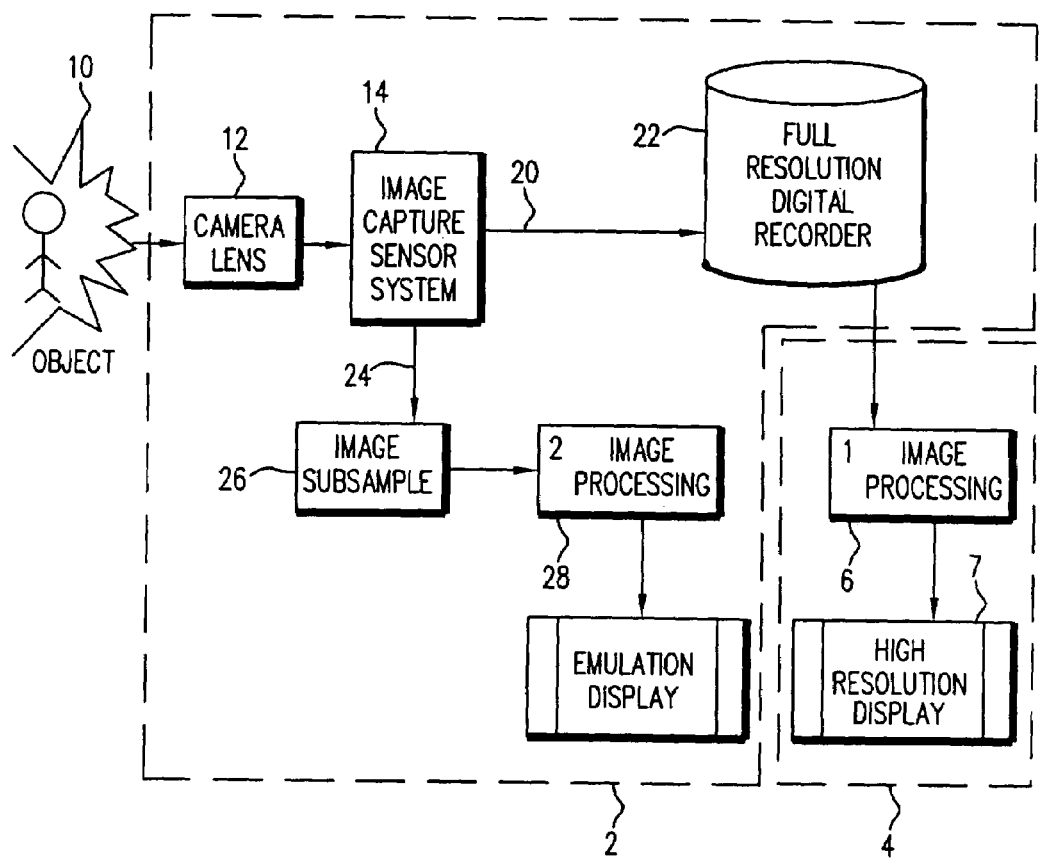
FIG. 1 is a block diagram of a first embodiment of the invention, showing a digital camera system that includes sub-sampling of the higher resolution image signal and on-board image processing of the sub-sampled signals to emulate the effect of post-processing on the higher resolution image signal.
Figure 2:
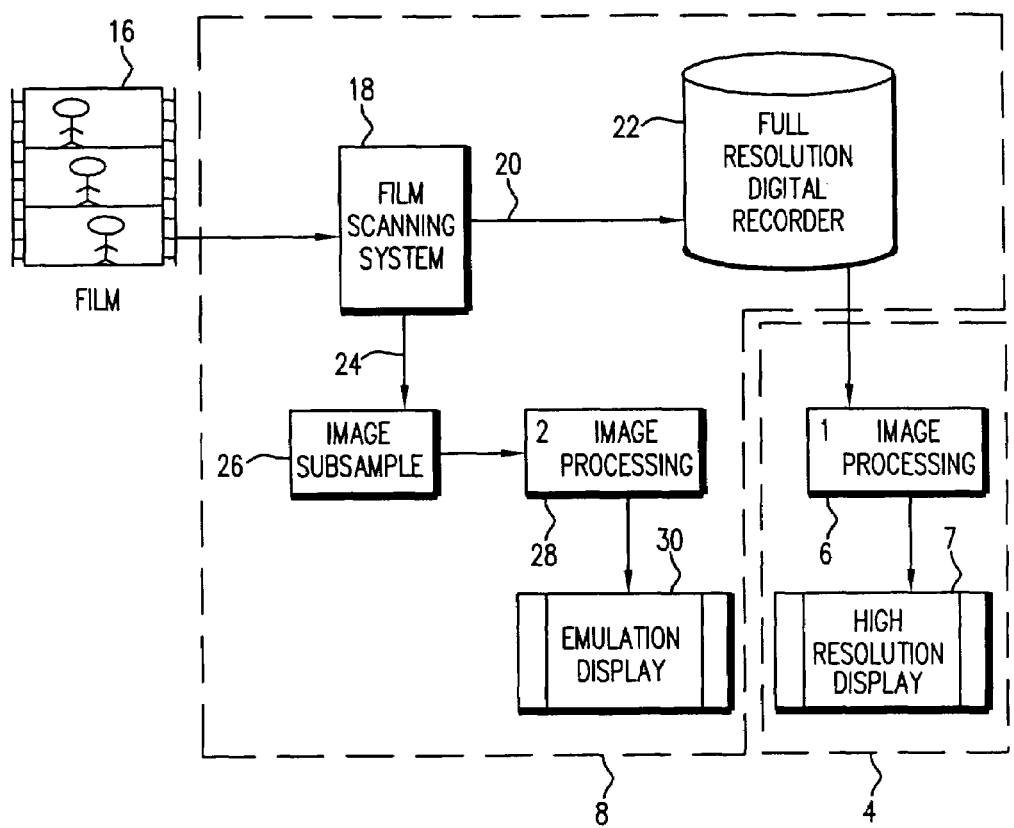
FIG. 2 is a block diagram of a second embodiment of the invention, showing a film scanner system.

The invention may be implemented with a digital camera system or a film scanner system. FIG. 1 shows a block diagram of a digital camera system 2 and a post-production stage 4. In the post-production stage 4, certain post-production algorithms are applied to the image sequence captured by the digital camera system 2. These algorithms are applied in a post-processing stage 6, and the results may subsequently be displayed on a high resolution display 7. In the typical situation, the camera system 2 is on location and the post-production stage 4 is separated both in time and distance from the location of image capture. In this diagram, a motion image sequence of a live object 10 is captured using a camera lens 12 and a high-resolution image sensor system 14. FIG. 2 shows a block diagram of a film scanner system 8 and a similar post-production stage 4, where certain post-production algorithms are applied to the image sequence captured by the film scanner system 8. Here, too, the algorithms are applied in the post-processing stage 6, and the results may be displayed on the high resolution display 7. In this diagram, an image sequence is captured from a film 16 using a high resolution film scanner system 18.

In the capture stage of either of these systems, an image of the scene to be captured is focused onto a focal plane comprising a full-resolution image sensor system. This sensor system can be comprised of one or more well-known monochrome or color digital image sensors, such as a charged-coupled device (CCD), a photodiode array, or some other image-sensing device that meets the system requirements. In a CCD based sensor, its spatial resolution will be dependent on the number of charged-coupled sensing elements on its surface. The greater the number of sensing elements, the higher the spatial resolution of the captured image frames will be. The selected sensor should also be able to operate at different frame rates and capture an image sequence with several mega-pixels per image frame. Once an image has been captured, it is passed on to the processing and output stages of the systems.

At this point in both diagrams, the captured image sequences take two different paths, each respective path identical in each of the diagrams. A first path 20 is direct and involves the passing of the captured image sequence to a digital recording device 22, which records the captured image sequence and downloads the recorded data into another media (not shown) for shipping to the post-production stage 4, where post-processing is performed on the recorded image sequence in the post-processing stage 6. In a second path 24, the captured image sequence is applied to a sub-sampling stage 26, where any of a number of conventional sub-sampling algorithms may be applied to the image sequence to reduce it to a sequence of lower resolution images. This allows for the application of a variety of image processing algorithms to the captured image sequence in an on-board image processing stage 28, as will be described in greater detail, all in real time. The applied image processing algorithms will simulate or be similar to those applied to the recorded image sequence in the post-processing stage 6. The sub-sampled and processed image sequence is then applied to a calibrated display device 30. The calibration of the display device is important for a successful fulfillment of the objective of this invention. Both of the image paths will be synched in a way to allow for concurrent display and recording of a particular image frame in the captured image sequence.

The last stage of the systems is the output, where the captured sequence is passed on to recording and display devices. The recording device 22 can be any well-known digital recorder like a digital VTR (video tape recorder) system. The digital recorder 22 will be recording the full-resolution raw RGB signal as the full-resolution image sensor system 14 or 18 interprets it. The other output device is the display unit 30. This unit will be displaying the sub-sampled and processed image sequence of a scene as it is being recorded to the digital recorder 22. The display unit is calibrated for tone and color as to maintain consistency with other display units, e.g., the display unit 7 used in the post-production stage 4. The calibration of the display devices can be done using a conventional software utility.

Figure 3:
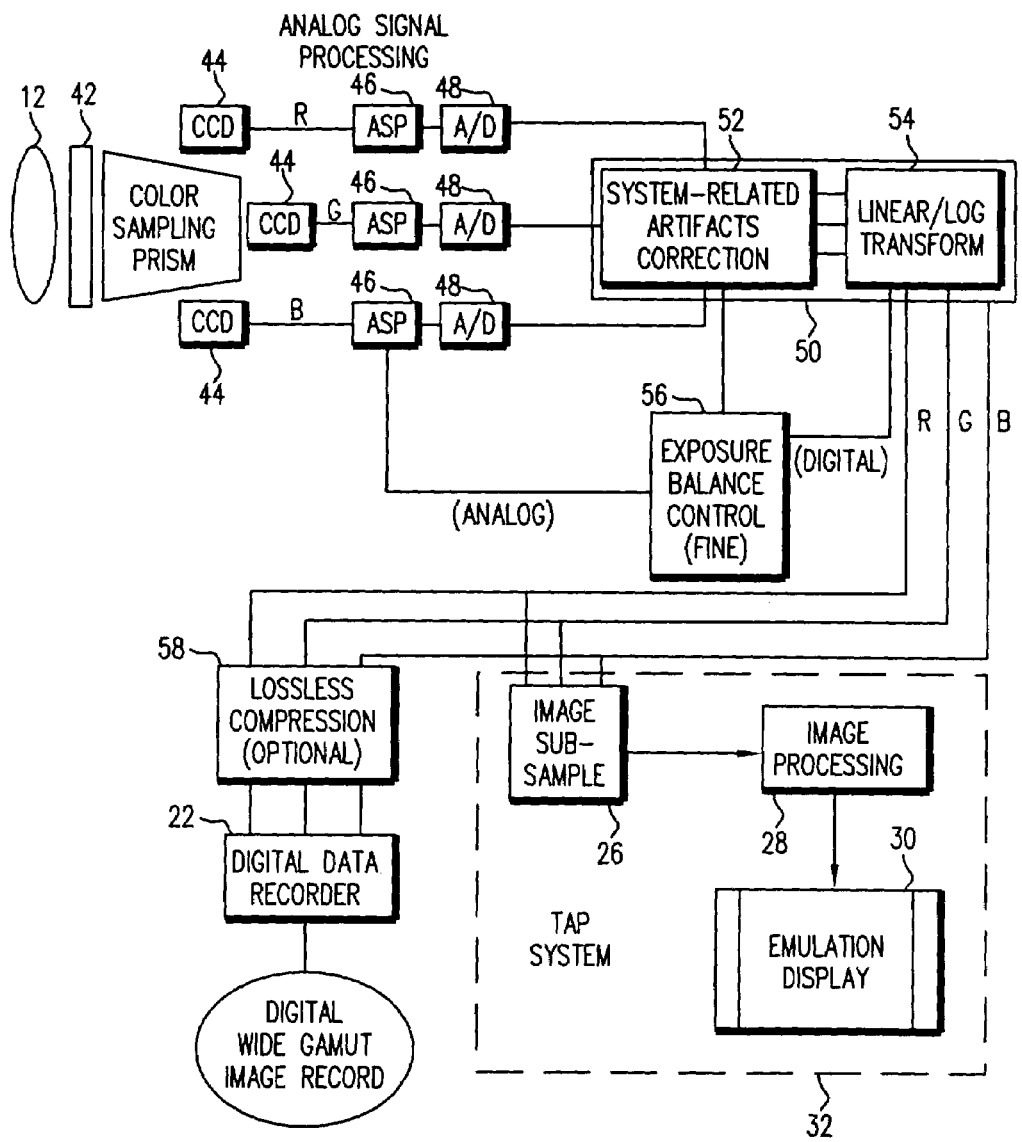
FIG. 3 is a detailed block diagram of the digital camera system shown in FIG. 1, wherein the elements of this invention are implemented in a video a tap.

FIG. 3 shows a more detailed diagram of the digital camera system 2 shown in FIG. 1, where the on-board image sub-sampling stage 26, the image processing stage 28 and the display device 30 are configured as a video tap 32 that is integrated with the camera system 2. As it is shown in the diagram, the full bandwidth captured RGB signal is passed as inputs to the tap unit as it is being passed to the digital recorder 22 for recording. As shown in FIG. 3, the lens 12 permits ambient light to enter a color splitting prism 30 for dividing the light into three separate red, green and blue (RGB) components, although those skilled in the art will recognize that other devices for separating the light into three color components may be used. Depending on the sensor's spectral characteristics, additional optical filtering 42 may be added to achieve minimal electronic/digital gain for a specified white illuminant and to reduce aliasing (due to a sensor's spatial sampling geometry).

Three photoelectric-type sensors 44 (preferably charge-coupled devices (CCDs)) receive the respective color components as separated (filtered) by the color splitting prism 40, and then respectively convert the particular color component into an electronic signal. Each sensor 44 preferably uses the same spatial resolution (the number of pixels per sensor). It is instructive to note that, if the color splitting prism is removed, a single sensor with a well known color-filter array superimposed and in registration with the pixels may be used to accomplish the color separation function provided by the above-described prism and sensor combination. It also facilitates understanding to note that more than three sensors 44 may be used, and that other color channels, different in number and color, may also be used as those skilled in the art will readily recognize. The image data will be captured at a pre-determined rate (e.g. 24 frames per second) by implementing any suitable technique to control the rate/time interval at which the sensor system gathers/integrates light (e.g. synchronized shutter).

Three analog signal processors (ASP) 46 respectively receive the electronic signals from the CCDs 44 for performing a plurality of processing functions on the analog signals, such as channel amplification, gain, etc. Three analog to digital (A/D) converters 48 respectively receive the signals from the ASPs 46 for converting each signal into digital form. A digital signal processor (DSP) 50 receives all of the signals from the A/D converters 48 for performing a plurality of processing functions on the received digital signals, such as to modify the image information with an algorithm 52 to reduce artifacts (filtering to prevent aliasing), and to reduce electronic noise originating in the camera's components (the fixed pattern noise correction applied to sensor-type arrays to eliminate the nonimage-related spurious signals associated with dark current and sensitivity difference between pixels). Additional signal processing (to linearize and/or optimally distribute the coded values in the analog to digital conversion) is performed by a linear or log transform 54 so that the RGB digital data is related to the light intensity measured by the sensor by a mathematical linear, log or power transfer function. Some of the operations described by the analog signal processor 46 could alternatively be done by the digital signal processor 50 or vice versa as those skilled in the art will recognize. An exposure balance controller 56 receives all three signals from the digital signal processor 50 and performs a white balance operation (i.e. signals are made equivalent for a particular white light source). Alternatively, this processing can be implemented by the ASP 46 or the DSP 50.

Optional data compression can be done after the DSP 50 operation, as indicated by the lossless compressor 58. The data is then stored by a digital recorder 22 on some medium, such as magnetic tape, disc, and the like, as wide gamut image data. The digital camera 2 as described herein can be employed in the system described in commonly-assigned, copending U.S. Ser. No. 09/082,958, entitled "Multi-stage Electronic Motion Image Capture and Processing System" and filed May 21, 1998 in the name of N. Rodriguez, where wide gamut image data is produced. Wide gamut image data is defined as the data captured by the three independent red, green and blue sensors 44, which has not been reduced in scope as a result of the type of processing that occurs in the prior art to render the image data compatible for TV display (or a standard video format). It is understood that using current technology such processing associated with the artifact correction algorithm 52, the transform 54 and the compressor 58 is only needed due to the limitations of existing technology, and that with technological advances such processing would be unnecessary. It facilitates understanding to note that the wide gamut data is dependent upon the dynamic range, spectral responsivity, and spatial resolution of the sensor in combination with the spectral transmittance bandpass of the three color beam splitters.

As it is shown in FIG. 3, the full bandwidth captured RGB signal is diverted as inputs to the video tap unit 32, as the RGB signal is being passed to the digital recorder 22 for recording. In the video tap unit 32, the full bandwidth captured RGB signal is sub-sampled by the image sub-sampling stage 26, the sub-sampled signal is processed in the image processing stage 28, and the processed signal is displayed by the display device 30.

The image processing method employed by the systems shown in FIGS. 1, 2 and 3 compromises two aspects. The first aspect involves the sub-sampling of the captured image sequence in the sub-sampling stage 26 to a lower resolution. A sub-sampled image frame is a smaller resized copy of the entire original image. The goal of this step is to allow for the application in real-time of any desired image processing algorithms. The term "real-time", as used in connection with this invention, is not an absolute term but instead is meant to indicate that the processing throughput is substantially equivalent to the image capture rate. Any well-known high-quality image sub-sampling method can be used, given that it does not produce significant image artifacts such as aliasing artifacts.

While an image sub-sampling stage 26 has been prescribed in order to reduce the data rate sufficiently to permit real time processing and viewing with conventional, inexpensive processing components, the skilled person would be mindful that faster, usually more expensive, processors are available, and in any event processing speeds are rapidly increasing, even for off-the-shelf components. Therefore, it is currently not necessary to do sub-sampling in order to achieve real time processing, certainly if expense is not an object and it certainly will not be necessary in the future as processing speeds ramp upward in their usual exponential manner. On-board processing will then occur on the full resolution version of the captured signal in order to match a desired look as provided by the post-production stage 4.

Figure 4:
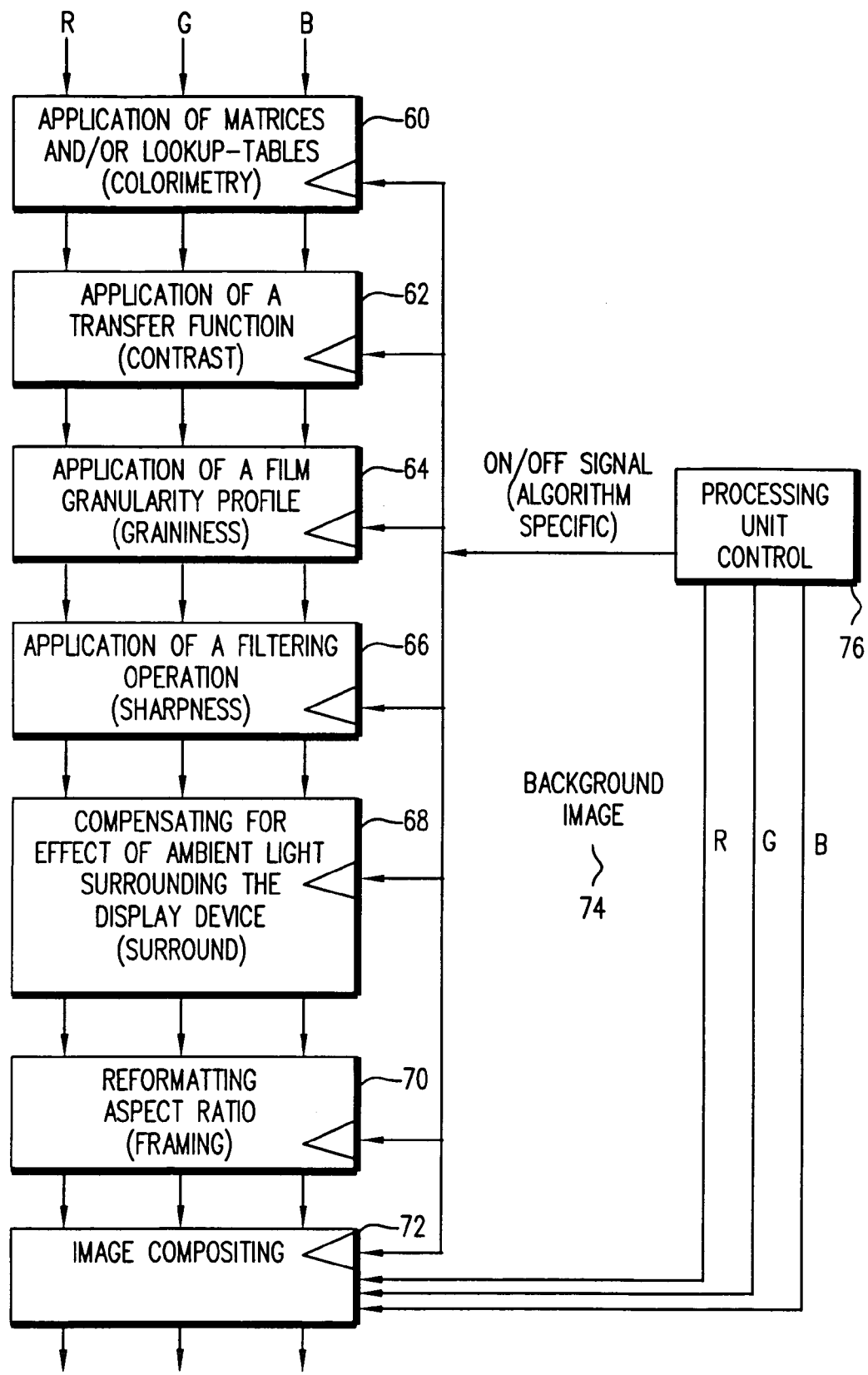
FIG. 4 is a block diagram of a suite of image processing algorithms that can be selectively incorporated in the on-board image processing unit of the systems shown in FIGS. 1, 2 and 3.

The second aspect in the image processing method employed by the systems shown in FIGS. 1, 2 and 3 involves the application of a pre-defined set of digital image/signal processing algorithms in the image processing stage 28. The intent of the applied algorithms is to simulate or be similar to any post processing that will be applied to the full-resolution recorded image-sequence in the post-processing stage 6. A particular suite of image processing algorithms of interest is applied to the RGB signals generated by the camera to modify the digitally captured image sequence to have similar characteristics had the image motion sequence been captured and then printed using the same suite of algorithms, but as a post-processing operation on a particular set of a traditional motion picture negative and print stocks. FIG. 4 shows examples of algorithms that accomplish these purposes. These algorithms include a colorimetry stage 60 and a contrast stage 62 for matching the tone/color (contrast/colorimetry) reproduction produced by a particular set of CCD responses with those of a traditional motion picture film (i.e., providing "film look"). This can be done by applying a correction matrix and/or three dimensional look-up tables to the captured RGB signal. Other film characteristics are added in a variety of stages including: a grain stage 64 for adding noise that has the same probability distribution function of a particular film stock (graininess); a sharpening stage 66 for spatially filtering the captured image to simulate the MTF of a motion picture film (sharpness); a surround stage 68 for compensating for the visually perceived image contrast change due to the level of ambient light surrounding the image display (surround); and a framing stage 70 for reducing/formatting the image data to conform within a specified image display aspect ratio, such as 16:9 (framing).

Another widely applied post-production image processing algorithm in the motion-picture industry is image compositing. Algorithms that can replace the background of a scene with another background 74 can be implemented in a compositing stage 72, allowing a cinematographer to accurately predict how a special-effect image sequence will look once it has been post processed. FIG. 4 shows a block diagram of a list of possible algorithms that can be implemented; other algorithms would be known to those of ordinary skill and are intended to be included within the reach of the invention. A processing unit 76 provides an operator with the ability to enable/disable any of the algorithms to be applied to the captured image sequence, as well as the ability to feed the system with another image-sequence for compositing purposes if desired. Algorithms of the type associated with each of the above operations are available in the literature and reproducible by those skilled in the art.

In summary, the present invention provides an apparatus and method for capturing a sequence of full-resolution images using a sensor system, and also processing in real-time a sub-sampled, or the full-resolution, version of the captured motion sequence to match a desired look. The objective of this processing is to provide an operator with a viewer that simulates the functionality of a video tap in a traditional motion picture camera. However, unlike a traditional motion picture camera's tap, the applied image processing is intended to simulate or be similar to the post processing that will take place on the full-resolution recorded image-sequence to match a particular look. Also, the image processing will be applied utilizing the entire "unprocessed RGB" signal. The term "unprocessed RGB" is used to define an RGB signal that has not undergone any type of standard video conversion (e.g. the typical transfer of RGB to $YC_rC_b$). Examples of looks the system is intended to simulate include the look of a particular motion-picture film stock, or a desired special-effect look such as image compositing. Another aspect of this invention is the projection of the sub-sampled and processed image-sequence into a calibrated display device. In practicing the invention, a typical workflow can be described as follows:

1. Capture an image-sequence using a full-resolution image sensor system.
2. Sub-sample the captured motion image-sequence into a lower resolution sequence. This step is presently prescribed to allow for real-time application of a specific set of image processing algorithms to the captured image-sequence.
3. Apply a set of image processing algorithms to the captured motion image-sequence. The applied algorithms will simulate or be similar to any post processing that will be applied to the recorded full-resolution image sequence. The same set of image processing algorithms can also be applied before any image sub-sampling "e.g. inside the camera."
4. Project the sub-sampled and processed motion image-sequence into a calibrated display device.

The invention has been described with reference to a preferred embodiment. However, it will be appreciated that variations and modifications can be effected by a person of ordinary skill in the art without departing from the scope of the invention.

| PARTS LIST | |
| --- | --- |
| 2 | digital camera system |
| 4 | post-production stage |
| 6 | post-processing stage |
| 7 | high resolution display |
| 8 | film scanner |
| 10 | object |
| 12 | camera lens |
| 14 | high resolution image sensor system |
| 16 | film |
| 18 | high resolution film scanning system |
| 20 | first path |
| 22 | digital recording device |

| -continued | |
| --- | --- |
| PARTS LIST | |
| 24 | second path |
| 26 | image sub-sampling stage |
| 28 | image processing stage |
| 30 | display device |
| 32 | video tap |
| 40 | color splitting prism |
| 42 | optical filtering |
| 44 | CCD sensors |
| 46 | analog signal processor |
| 48 | A/D converter |
| 50 | digital signal processor |
| 52 | artifact algorithm |
| 54 | linear - log transform |
| 56 | exposure balance controller |
| 58 | lossless compressor |
| 60 | colorimetry stage |
| 62 | contrast stage |
| 64 | grain stage |
| 66 | sharpness stage |
| 68 | surround stage |
| 70 | framing stage |
| 72 | compositing stage |
| 74 | background |
| 76 | processing unit controller |

What is claimed is:

1. A method for converting a sequence of motion images, captured by an image capture system, into a sequence of modified motion images providing the previewed appearance of motion images captured by the same capture system and subsequently rendered in a post-processing stage as a user choice to simulate an available look, said method comprising the steps of:

capturing a sequence of motion images using a full resolution image sensor system, resulting in a captured sequence of full resolution unprocessed image signals corresponding to the motion images;

directing the captured sequence of full resolution unprocessed image signals to a first path for recording;

recording the full resolution unprocessed image signals;

providing the recorded full resolution unprocessed image signals to a post-production process where the images will be subsequently rendered in a post-processing stage to simulate a particular look;

sampling, in real time on a second path, the full resolution unprocessed image to provide a sub-sampled image;

displaying the sub-sampled image as a sequence of modified images for previewing of possible post-production image processing choices; and, applying, within the image capture system, one or more image processing algorithms to the unprocessed image signals to simulate one or more available looks that can be rendered in the post-processing stage, while using the sub-sampled image as a real time preview feedback, thereby resulting in a processed sub-sampled image of a post-production processing choice for the captured sequence of motion images.

2. The method as claimed in claim 1 wherein the motion images are electronically captured by a digital camera.

3. The method as claimed in claim 1 wherein the motion images are on film and are electronically captured by a film scanner.

4. The method as claimed in claim 1 further including subsampling the captured sequence of full resolution unprocessed image signals, thereby resulting in subsampled unprocessed image signals; and applying one or more image processing algorithms to the subsampled unprocessed image signals to simulate the particular look, thereby resulting in processed image signals, and displaying the processed image signals as a sequence of modified images.

5. The method as claimed in claim 1 wherein the step of displaying the processed image signals as the sequence of modified images occurs contemporaneously with the step of recording the full resolution unprocessed color signals.

6. The method as claimed in claim 1 wherein the captured sequence of full resolution unprocessed image signals comprises a captured sequence of full resolution unprocessed color signals.

7. The method as claimed in claim 1 wherein the step of applying, within the image capture system, one or more image processing algorithms to the unprocessed image signals includes application of at least one of the following algorithms: a colorimetry algorithm for matching the color reproduction produced by a particular set of image sensor responses with those of a traditional motion picture film; a contrast algorithm for matching the tone reproduction produced by a particular set of image sensor responses with those of a traditional motion picture film; a grain algorithm for adding noise that has the same probability distribution function as the graininess of a particular film stock; a sharpening algorithm for spatially filtering the captured image to simulate the modulation transfer function of a motion picture film; a surround algorithm for compensating for the visually perceived image contrast change due to the level of ambient light surrounding an image display; a framing algorithm for reducing or formatting the image data to conform within a specified image display aspect ratio; and an image compositing algorithm that can replace the background of a scene with another background.

8. The method as claimed in claim 1 wherein the particular look imparted by the post-processing stage is due to one or more special effects and the processed image signals are rendered to simulate the special effects look, as would be provided in the post-processing stage.

9. The method as claimed in claim 1 wherein the processed image signals are rendered to simulate a particular look of a film stock, as would be provided in the post-processing stage.

10. A method for converting a sequence of motion images, captured by an image capture system, into a sequence of modified motion images providing the appearance of motion images captured by the same capture system and subsequently rendered in a post-processing stage to simulate a particular look, said method comprising the steps of:

capturing a sequence of color motion images using a full resolution image sensor system, resulting in a captured sequence of full resolution unprocessed color signals corresponding to the color motion images;

recording the full resolution unprocessed color signals;

providing the recorded full resolution unprocessed color signals to a post-production process where the images will be subsequently rendered in a post-processing stage with a particular look;

subsampling, in real time, the captured sequence of full resolution unprocessed color signals, thereby resulting in real time sub-sampled unprocessed color signals;

applying one or more image processing algorithms to the sub-sampled unprocessed color signals to simulate looks that can be rendered in the post-processing stage, while using the sub-sampled image as a real time preview feedback, thereby resulting in processed color signals that represent chosen post-production processing for recorded full resolution color signals; and displaying the processed color signals as a sequence of modified images, said displaying occurring contemporaneously with the step of recording the full resolution unprocessed color signals.

11. A video tap apparatus integrated with a digital capture device for converting a sequence of motion images into a sequence of modified motion images that enables previewing an available post-production look, said apparatus comprising:

a full resolution image sensor system for capturing a sequence of color motion images, resulting in a captured sequence of full resolution unprocessed color signals corresponding to the color motion images;

a recorder for recording the full resolution unprocessed color signals;

a camera output for providing the recorded full resolution unprocessed color signals to a post-production process where the images will be subsequently rendered in a post-processing stage to simulate a particular look;

a processor for applying one or more image processing algorithms to the unprocessed color signals, from the videotap apparatus during image capture, to simulate the looks that can be rendered in post-production to the full resolution unprocessed color signals, and providing a sub-sampled image for real time preview of simulated post-production processing, thereby resulting in processed color signals, whereby said simulation of the particular look occurs contemporaneously with the recording of the full resolution unprocessed color signals by said recorder;

a sub-sampling processor for subsampling the captured sequence of full resolution unprocessed color signals, thereby resulting in sub-sampled unprocessed color signals; and wherein the processor applies one or more image processing algorithms to the subsampled unprocessed image signals to simulate the particular look, thereby resulting in processed image signals that are displayed by the display device; and a display device for displaying the processed color signals as a sequence of modified images.

12. The video tap apparatus as claimed in claim 11 wherein the digital capture device is a digital camera.

13. The video tap apparatus as claimed in claim 11 wherein the digital capture device is a film scanner.

14. A method for converting a sequence of motion images, captured by an electronic image capture system within a second path, into a sequence of modified motion images providing the appearance of motion images captured by a motion capture system within a first path and subsequently rendered in a post-processing stage to simulate a particular look, said method comprising the steps of:

capturing a sequence of motion images, within a second path, using the electronic image capture system, to produce a captured sequence of digital image signals corresponding to the motion images captured by the motion capture system within a first path;

providing the motion images captured by the motion capture system within the first path to a post-production process where the images will be subsequently rendered to simulate a particular look;

applying, within the electronic image capture system within the second path, one or more image processing algorithms to the digital image signals to simulate the particular look rendered in the post-processing stage that will be applied to the corresponding motion capture system within the first path, thereby resulting in processed image signals within the second path; and displaying the processed image signals as a sequence of modified images.

* * * * *